O. V. PARSONS.
SELF CLEANING HAND RAKE
APPLICATION FILED JUNE 26, 1918.
1,371,109. Patented Mar. 8, 1921.
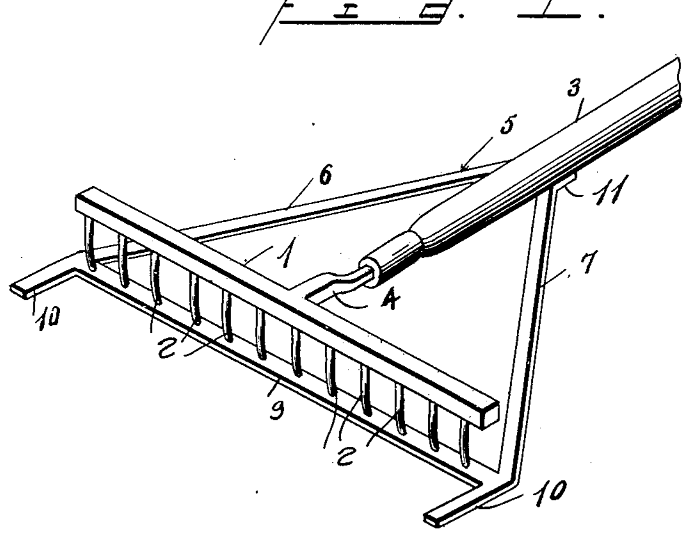
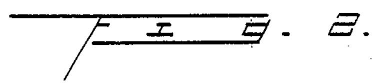
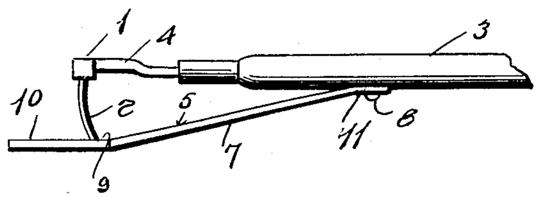
Witnesses
E. A. Stanton.
M. K. Johnston
Inventor
O. V. Parsons.
By Randolph [signature] Attorney

UNITED STATES PATENT OFFICE.

OSCAR VICTOR PARSONS, OF AFTON, IOWA.

SELF-CLEANING HAND-RAKE.

1,371,109. Specification of Letters Patent. Patented Mar. 8, 1921.

Application filed June 26, 1918. Serial No. 242,081.

*To all whom it may concern:*

Be it known that I, OSCAR VICTOR PARSONS, a citizen of the United States, residing at Afton, in the county of Union and State of Iowa, have invented certain new and useful Improvements in Self-Cleaning Hand-Rakes; and I do hereby declare the following to be a full, clear, and exact description of the invention, such as will enable others skilled in the art to which it appertains to make and use the same.

My invention relates to improvements in self-cleaning hand-rakes, and has for one of its objects the provision of a novel device of this character which will permit leaves, grass and other rubbish to be automatically removed from the curved rake teeth when the head of the rake is lifted from the ground.

A further object of the invention is the provision of a self-cleaning attachment for hand-rakes which shall be simple, durable and efficient, and which may be manufactured and sold at a comparatively low cost, and which may be readily applied to rakes of any well known form.

With the above and other objects in view the invention consists in the construction, combination and arrangement of parts hereinafter fully described and claimed, and illustrated in the accompanying drawing, wherein:

Figure 1 is a perspective view of a rake equipped with a cleaning attachment constructed in accordance with my invention, and, Fig. 2 is a side elevation of the rake and cleaning attachment.

Referring to the drawing by numerals, 1 designates the head, 2 the teeth and 3 the handle of a rake of a well known form and construction. The teeth 2 are curved and the head 1 is secured to the handle 3 and a shank 4.

The cleaning attachment comprises a V-shaped frame 5 which includes spring arms 6 and 7 and which is secured at its apex to the under side of the handle 1 by a bolt 8. The arms 6 and 7 extend forwardly from the point of attachment of the frame to the handle 1, and carry at their forward ends a stripping bar 9 which is slidably mounted upon the teeth 2, and which is provided with openings 9ª to receive the teeth. The stripping bar 9 is normally retained at the outer ends of the teeth 2 by the arms 6 and 7. The outer ends of the stripping bar 9 are provided with forwardly extending runners 10. At its apex, the frame 5 is provided with a transversely curved head 11 to receive the underside of the handle 3, the head permitting the frame to be firmly secured to the handle by the bolt 8.

All parts of the cleaning attachment are integrally connected. In view thereof, and in view of its configuration, the cleaning attachment may be stamped up from a blank of metal in a single operation.

The operation of the rake may be stated to be as follows. The handle of the rake is grasped in the usual manner and a downward pressure is applied thereto. This causes the lower ends of the rake teeth to be forced downwardly below the stripping bar and brought into engagement with dead grass, leaves and other trash to be gathered. The rudders 10 prevent the stripper bar 9 from being forced into the ground during downward pressure on the teeth 2. When it is desired to clean the rake teeth it is only necessary to lift them out of engagement with the ground, as soon as this has been done the arms 6 and 7 force the stripping bar to the ends of the teeth, freeing them of all trash accumulated therein.

While I have described my invention as above, it is understood that various minor changes in the details of construction may be made within the scope of the appended claim without sacrificing any of the advantages of my invention.

Having thus fully described my invention, what I claim as new and desire to secure by Letters Patent is:

A rake attachment including an attaching portion, a V-shaped frame formed integral with the attaching portion and including a pair of spring arms, a stripping bar connecting the outer ends of the arms and having a plurality of spaced openings for receiving rake teeth, and spaced runners extending from the outer ends of the arms and formed integral therewith, the stripping bar and runners lying in the same horizontal plane.

In testimony whereof I affix my signature in presence of two witnesses.

OSCAR VICTOR PARSONS.

Witnesses:
M. E. PARSONS,
MARIE PARSONS.